No. 845,584. PATENTED FEB. 26, 1907.
H. SCHWENCK.
MEAT CUTTER.
APPLICATION FILED OCT. 11, 1906.

Witnesses
Arthur Joseph
William Schulz

Inventor
Henry Schwenck
By his Attorney

UNITED STATES PATENT OFFICE.

HENRY SCHWENCK, OF NEW YORK, N. Y.

MEAT-CUTTER.

No. 845,584. Specification of Letters Patent. Patented Feb. 26, 1907.

Application filed October 11, 1906. Serial No. 338,409.

*To all whom it may concern:*

Be it known that I, HENRY SCHWENCK, a citizen of the United States, residing at New York city, (Richmond,) county of Richmond, State of New York, have invented new and useful Improvements in Meat-Cutters, of which the following is a specification.

This invention relates to an improved apparatus for quickly and thoroughly cutting meat by means of a blade that is simultaneously rotated and reciprocated. The apparatus is reliable in its operation, is readily operated, and may be easily inspected and cleaned.

Figure 2:
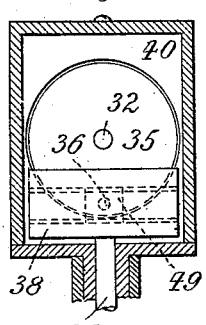
Figure 1:
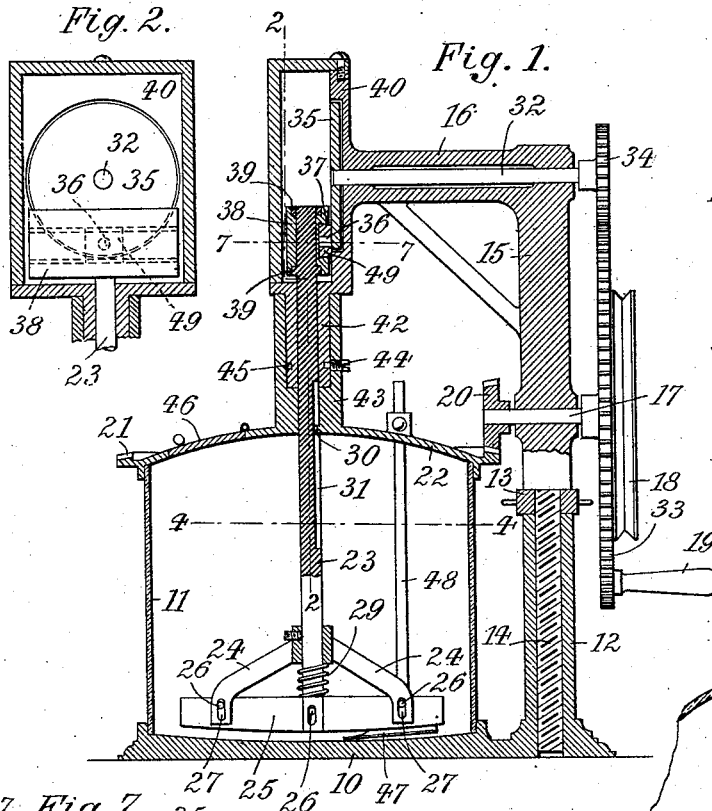
Figures 5, 6:
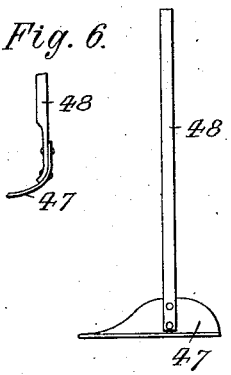
Figure 4:
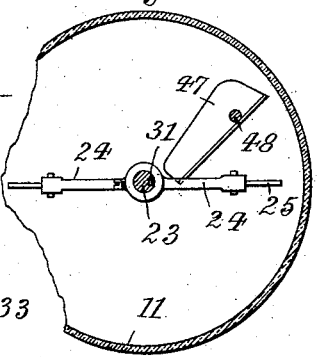
Figure 7:
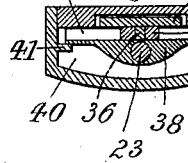
Figure 3:
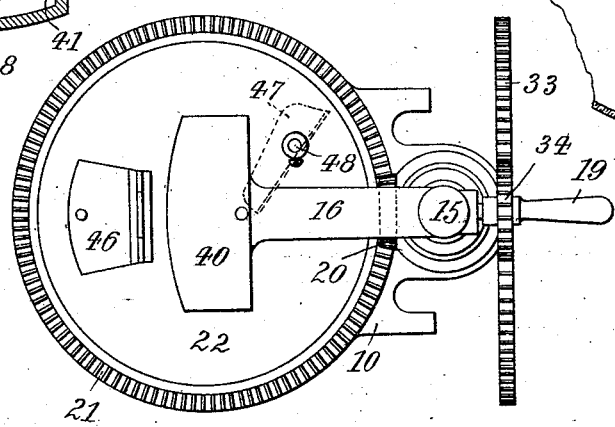

In the accompanying drawing, Figure 1 is a vertical section of my improved meat-cutter; Fig. 2, a vertical section on line 2 2, Fig. 1; Fig. 3, a plan; Fig. 4, a horizontal section, partly broken away, on line 4 4, Fig. 1. Figs. 5 and 6 are details of the scoop; and Fig. 7, a cross-section on line 7 7, Fig. 1.

From the laterally-extended base 10 of mixing vessel 11 projects a tubular upright 12, supporting a nut 13. This nut engages the lower threaded and reduced end 14 of a vertically-movable post 15, having an upper horizontal arm 16. The power-shaft 17, driven by pulley 18 or handle 19, is journaled in post 15 and carries a gear-wheel 20, which engages the toothed rim 21 of a cover 22, rotatably supported on vessel 11. Through a central opening of cover 22 extends into vessel 11 a vertically movable and rotatable shaft 23, to the lower end of which is yieldingly secured by arms 24 the cutting-blade 25. The means for effecting the yielding connection between shaft and blade consist of pins 26 on the blade, engaging slots 27 of the arms, and of a spring 29 bearing upon the blade. The rotating movement of cover 22 is transmitted to shaft 23 by a feather 30 on the former engaging a groove 31 of the latter. A counter-shaft 32, journaled in arm 16, is rotated from power-shaft 17 by gear-wheels 33 34. On inner end of shaft 32 is fast a crank-disk 35, having wrist-pin 36. A tapering head 49, loosely carried by this pin, reciprocates horizontally in an undercut guideway 37 of a slide 38. This slide is vertically perforated to embrace upper end of shaft 23, which is rotatably secured to the slide by collars 39. Disk 35 and slide 38 are contained within a housing 40, secured to arm 16 and having guide-rails 41 for slide 38.

A tubular extension 42 of housing 40 is stepped into a hub 43, integral with cover 22 and rotatable around such extension. A screw 44 of hub 43 enters a circumferential groove 45 of extension 42.

The meat to be chopped is introduced into vessel 11 through a lid 46 of cover 22. When shaft 17 is rotated, it will by wheels 33 34, counter-shaft 32, crank-disk 35, and slide 38 impart a reciprocating movement to shaft 23, At the same time a rotary movement will be imparted to said shaft by wheel 20 and cover 22, so that in this way the blade 25 is simultaneously reciprocated and rotated to thoroughly chop or cut up the meat. To assist this action of the blade, a curved scoop 47 is secured to cover 22 by arm 48, so that it will rotate together with the blade. By turning nut 13 post 15 will be raised to raise shaft 23 by crank-disk 35 and slide 38, while cover 22 will be simultaneously raised by extension 42 of housing 40 and screw 44. In this way the blade may be readily cleaned and free access to the interior of vessel 11 may be had.

I claim—

1. A meat-cutter provided with a vessel, a perforated cover supported thereon, rotating means in engagement with the cover, a cutter-shaft rotatably engaged by the cover and adapted to reciprocate through the same, a cutter carried by said shaft, a perforated slide loosely engaging the shaft and adapted to reciprocate the same, and reciprocating means in engagement with the slide, substantially as specified.

2. A meat-cutter provided with a vessel, a perforated cover supported thereon, rotating means in engagement with the cover, a cutter-shaft rotatably engaged by the cover and adapted to reciprocate through the same, a cutter carried by said shaft, a perforated slide loosely engaging the shaft and adapted to reciprocate the same, and a crank-disk engaging the slide, substantially as specified.

3. A meat-cutter provided with a vessel, a power-shaft, a gear-wheel and crank-disk rotated thereby, a cover having a toothed rim engaged by the gear-wheel, a cutter-shaft engaged by the cover, a cutter carried by said shaft, and a slide on the shaft engaged by the crank-disk, substantially as specified.

4. A meat-cutter provided with a vertically-adjustable post, a housing secured thereto, a vessel, a cover rotatable thereon and having a hub rotatably secured to the housing, a cutter-shaft engaged by the cover, a cutter carried by said shaft, and means inclosed by the housing for reciprocating the shaft, substantially as specified.

Signed by me at New York city, Manhattan, New York, this 10th day of October, 1906.

HENRY SCHWENCK.

Witnesses:
    FRANK V. BRIESEN,
    WILLIAM SCHULZ.